Nov. 10, 1953 C. W. HANSEN 2,658,319
FIELD OR ROW CROP FORAGE HARVESTER
Filed Jan. 28, 1948 6 Sheets-Sheet 1
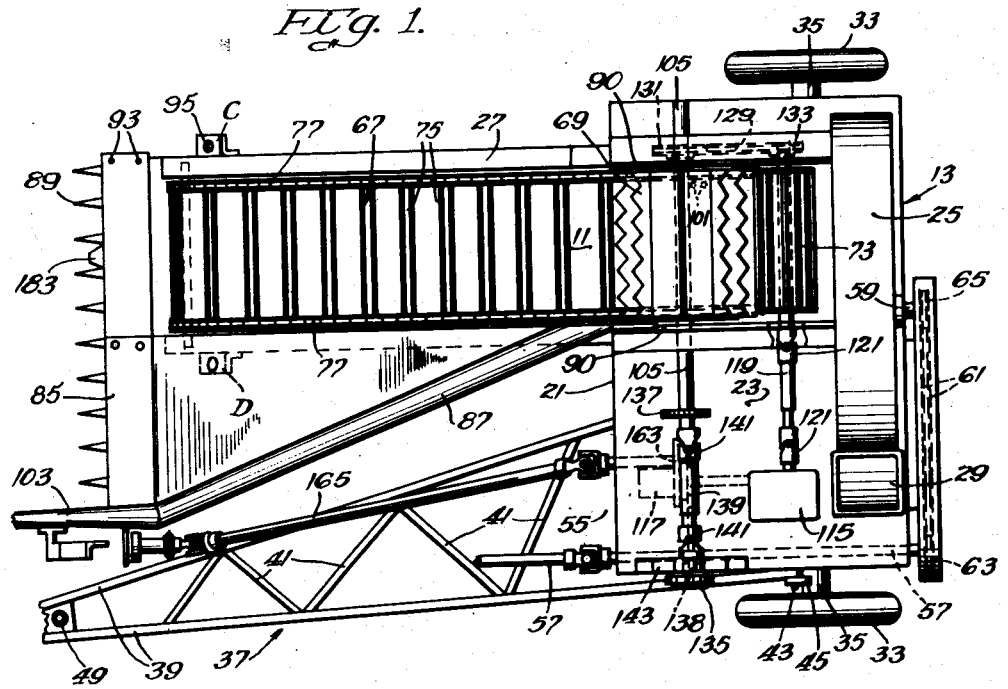
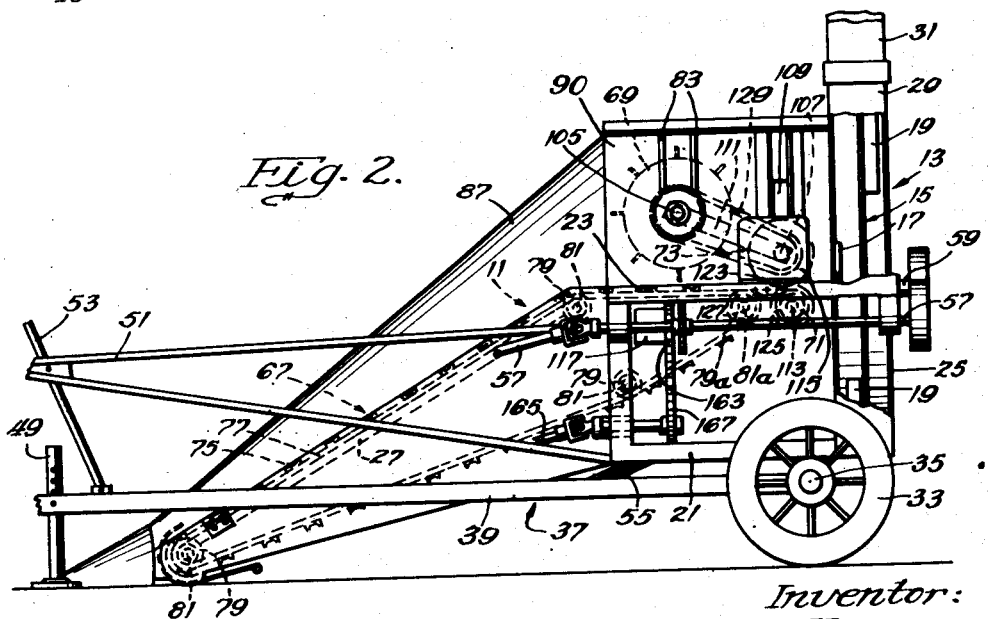
Inventor:
Charles W. Hansen
By Soans, Pond, & Anderson
Attys.

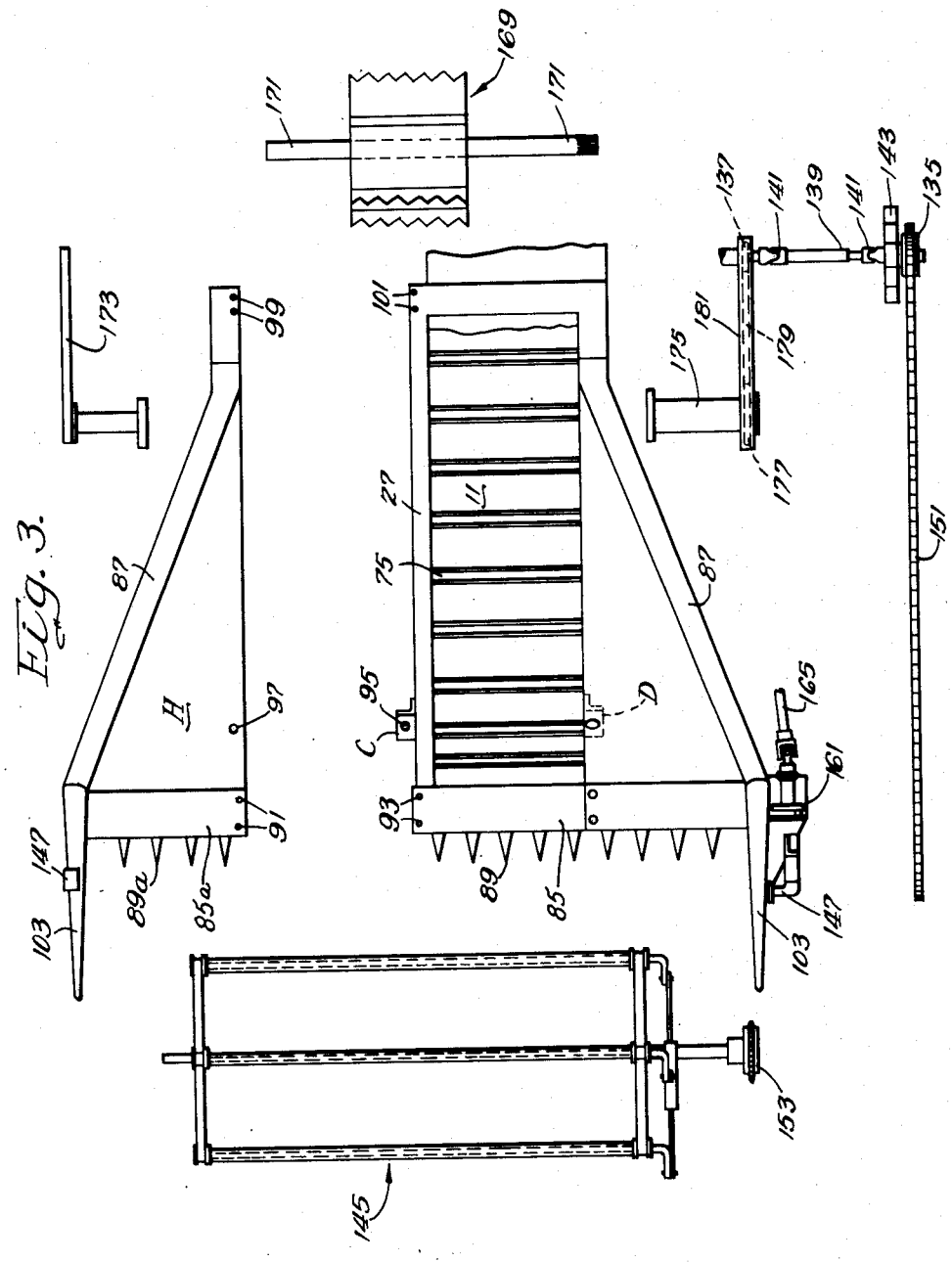

Nov. 10, 1953 — C. W. HANSEN — 2,658,319
FIELD OR ROW CROP FORAGE HARVESTER
Filed Jan. 28, 1948 — 6 Sheets-Sheet 3

Inventor:
Charles W. Hansen

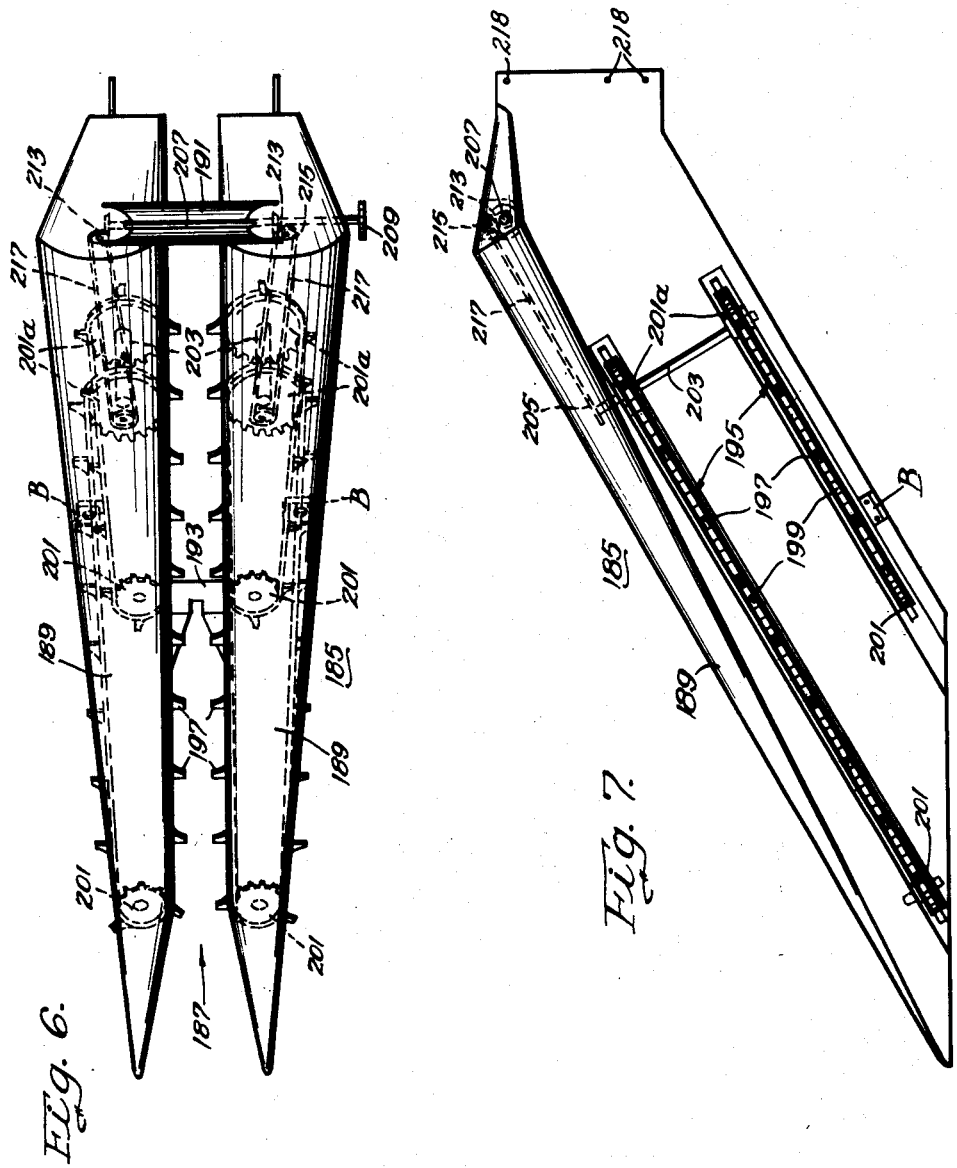

Nov. 10, 1953　　　　C. W. HANSEN　　　　2,658,319
FIELD OR ROW CROP FORAGE HARVESTER
Filed Jan. 28, 1948　　　　　　　　　　　　　　　　6 Sheets-Sheet 6
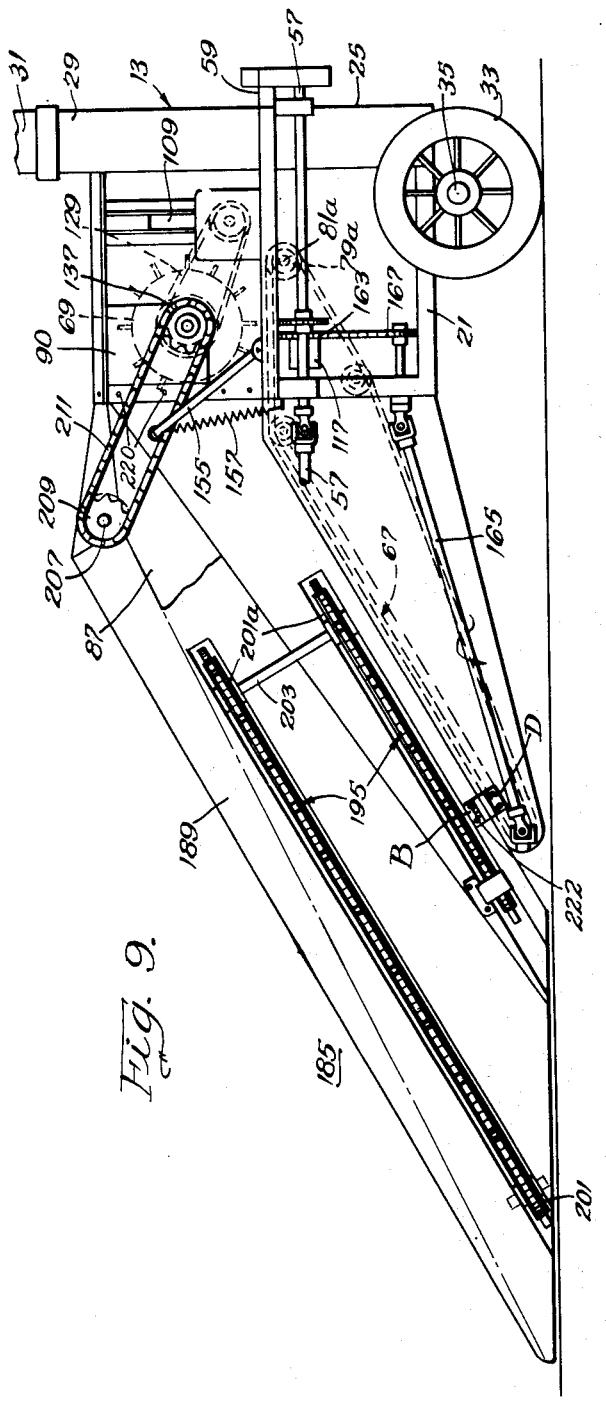
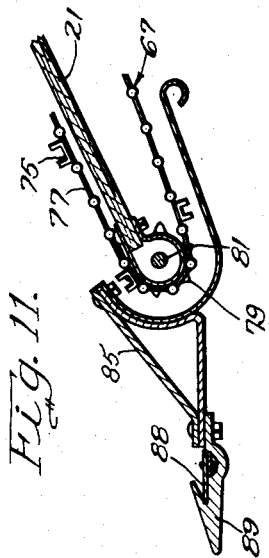
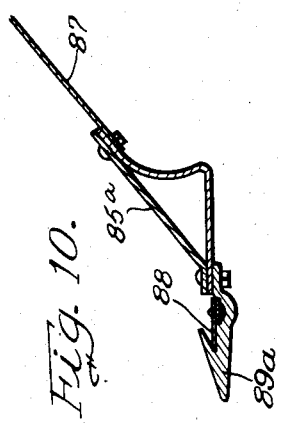
Inventor:
Charles W. Hansen
By Soans, Pond & Anderson,
Attys.

Patented Nov. 10, 1953

2,658,319

UNITED STATES PATENT OFFICE 2,658,319

FIELD OR ROW CROP FORAGE HARVESTER

Charles W. Hansen, Racine, Wis., assignor to J. I. Case Company, Racine, Wis., a corporation of Wisconsin Application January 28, 1948, Serial No. 4,830

3 Claims. (Cl. 56—2)

The present invention relates to harvesting equipment of the general type known as field forage harvesters and, in particular, to field forage harvesters which are readily adaptable to cut either field crops or row crops.

In general, it is required that field forage harvesters of this latter type shall be capable of handling at least two types of forage crops. The first type includes field or broadcast crops such as hay, alfalfa, legumes, grasses and the like which must be mowed in a wide swath; and the second type includes stalk crops such as corn and sorghum, which are grown in rows that must be cut individually. The great differences in the cutting and handling methods for the two types of crops result in the need for a harvester having interchangeable crop collecting and feeding units which may be readily combined with a single, basic, mowing, conveying, and processing unit to efficiently harvest either type of crop.

The principal object of the present invention is to provide an improved forage crop harvester of this general type, and as will hereinafter appear this object is accomplished by the provision of a harvester wherein independent crop collecting and feeding units are interchangeably mounted on a basic unit which embodies an ensilage cutting and blowing mechanism, a conveyor for conducting the crops to the ensilage cutting mechanism, and drive and guard members for interchangeable mowing and cutting bars which are selectively used for the various crops. A more specific object of the invention includes the provision of means for attaching various interchangeable crop collecting and feeding units to the basic unit so that the implement can be converted to process either broadcast crops or row crops by changing a minimum number of parts. The above and other objects and advantages of the invention are accomplished by the use of novel structural combinations and improvements, the features of which will be made apparent in the accompanying drawings and the following description.

In the drawings:

Figs. 1 and 2 are plan and side views, respectively, of the basic harvester unit which comprises a unitary ensilage cutting and delivery unit, a conveyor for conducting material to the cutting and delivery unit, and draft means for connecting the harvester to a draft vehicle, with parts broken away and in section in Fig. 2;

Fig. 3 is an exploded view showing the elements of mechanism which are attached to the basic unit to adapt it for the processing of broadcast crops;

Figs. 6 and 7 are a plan and a side elevational view, respectively, showing the row crop gathering and feeding means which is adapted to be attached to the basic unit of the harvester;

Figs. 8 and 9 are a plan and a side elevational view, respectively, of the assembled harvester adapted for use in processing row crops;

Fig. 10 is a sectional view taken on line 10—10 in Fig. 4; and

Fig. 11 is a sectional view taken on line 11—11 in Fig. 4.

Figure 4:
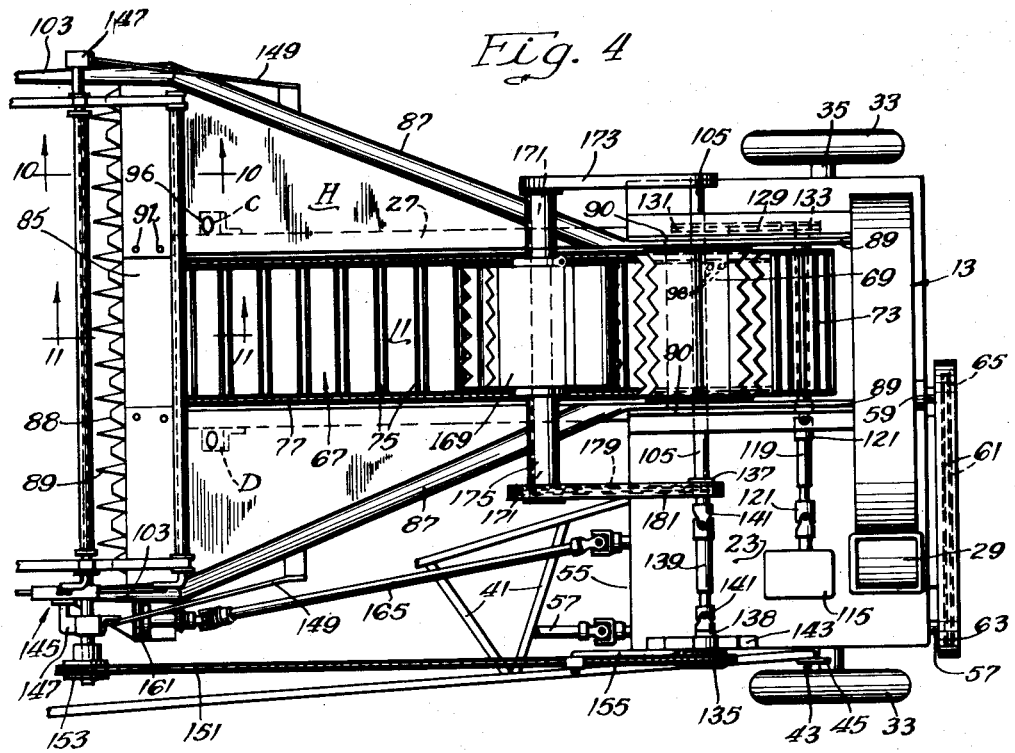
Figs. 4 and 5 are plan and side views, respectively, of the assembled mechanism adapted to process broadcast crops.

The forage crop harvester illustrated in the drawings is operable to sever the crop from the field, to convey the severed crop to the crop cutting and delivery unit wherein it is cut into suitable short lengths for the making of silage, and subsequently, to deliver the cut crop through a blower outlet to a wagon or other conveyance by which the material is hauled to a disposition point. As before pointed out, the harvester of the invention is adapted for rapid conversion from an apparatus which is adapted to process a standing field or broadcast crop to an apparatus which is adapted to process a standing row crop. In order to accomplish the efficient transition from one type of harvesting to the other, it is desirable that the fewest number of parts be removed from the basic unit and that a minimum number of parts be added to convert the apparatus.

In the following description, the basic conveyor and crop cutting and delivery unit, together with the elements which are needed to harvest a broadcast or field crop, will first be described in detail. After the field crop harvesting mechanism has been described, the several changes needed to convert the harvester to process row crops will be described, together with a detailed description of the various conversion parts which are required.

The conveyor and crop cutting and delivery unit, which is the main or basic unit for the field forage harvester, and which is particularly illustrated in Figs. 1 and 2, includes a forwardly and downwardly extending conveying means 11 which is adapted to convey crops which are mowed or cut in the field into a combined cutting and delivery unit 13. The cutting and delivery unit 13 includes a cutting and blower wheel 15 which is provided with suitable knives 17 for chopping the crop into the proper lengths for storage in a silo or the like, and blowing vanes 19 for delivering the silage cut in the unit to a wagon or other transport vehicle. The basic unit supports the complete harvester and includes a main frame 21, which is fabricated from suitable structural members which define a generally horizontal platform portion 23, a housing 25 for containing the cutter and blower wheel 15, and a forwardly and downwardly extending portion 27 which is adapted to support the conveying means 11. One side of the blower housing 25 is provided with an outlet conduit 29 for the cut crop material, and an outlet or delivery pipe 31 is arranged to fit over the upper end of the conduit 29.

Suitable support wheels 33 are journalled on an axle 35 which is attached to the main frame 21 of the basic unit in order that the harvester may be moved in the field during use. A fabricated drawbar 37, which includes a pair of channel side sections 39 and suitable cross members 41, is hingedly connected to the axle 35 by means of co-axial hinge pins 43 which engage gusset plates 45 welded to the axle 35. The illustrated embodiment of the invention is a pull type implement and it is intended to be drawn by, and powered from a tractor. However, it will be apparent to those skilled in the art that various of the novel features of the invention can be incorporated in a self-propelled implement or in a tractor supported implement.

The forward end of the drawbar 37 is adapted to be connected to the tractor draft gear by means of a suitable hitch plate 47 (Fig. 8) and hitch pin (not shown). The forward end of the drawbar 37 is provided with an adjustable stand 49 (Fig. 2) in order that it may be supported at the proper elevation when the harvester is being coupled to the tractor; the stand 49 is raised during use.

During the operation of the implement in a field, it is necessary that the height of the forward end of the implement be adjustable to conform with the crop and field conditions. In the embodiment of the invention illustrated, the adjustment is made possible by means of a rigid, fabricated, yoke 51 which it attached to the main frame 21 and which extends forwardly to a position above the forward end of the drawbar 37. The adjusting yoke 51 is maintained in a fixed position relative to the drawbar 37 by means of a conventional, notched link and spring latch arrangement 53. The weight or a large portion of the implement is counter-balanced by means of a compression spring 55 which extends between the drawbar 37 and the main frame 21.

In order to facilitate the transmission of power to the implement, a longitudinally extending power take-off shaft 57 is rotatively supported on the drawbar 37 in suitable brackets (not shown). The forward end of the power take-off shaft 57 includes a connecting coupling (also not shown) which is adapted to engage the power take-off on the tractor.

The cutter and blower wheel 15 is supported on a shaft 59 which is journalled in suitable bearings on the main frame 21. The shaft 59 is driven by a direct connection to the implement power take-off shaft 57, which is connected with the power take-off on the tractor. Power is transmitted to the cutter and blower wheel supporting shaft 59 by means of a pair of chains 61 which engage a sprocket 63 on the drive shaft 57 with a sprocket 65 on the shaft 59. A shear plate (not shown) is supported upon the main frame 21 adjacent the path of the cutting knives 17, and it cooperates with them to effect the cutting of the crop. Under some conditions it may be desirable to employ a cylinder-shaped, cutting and delivery unit which may be of the type illustrated in Patent No. 1,564,586, which was issued to Norman R. Krause.

The conveying means 11, which constitutes a part of the basic unit, is supported upon the forwardly and downwardly extending portion 27 of the main frame 21. The conveying means 11 includes an endless cross-slat conveyor 67, a delivery roll 69, and a pair of squeeze type feed rolls 71 and 73 for moving the crop material being processed over the shear plate. The endless conveyor 67 comprises a plurality of cross-slats 75 whose ends are connected by means of a pair of spaced-apart, endless chains 77. The chains 77 are supported upon sprockets 79 and 79a attached to suitable shafts 81 and 81a which are journalled into the frame 21 of the basic unit. The upper run of the endless conveyor 67 is supported upon the downwardly extending portion 27 of the main frame 21. The delivery roll 69 is supported above the endless conveyor 67, adjacent its discharge end, in a pair of positioning yokes 83 which permit vertical movement of the roll 69 in response to variations in the volume of crop material passing into the cutting and delivery unit 13. As seen best in Fig. 2, opposite end portions of the shaft 105 for the delivery roll 69 normally rest in the bottom of the yokes 83 in freely moveable relation thereto and any vertical thrust on the roll will, therefore, effect a movement of the shaft upwardly in the yokes.

The cross-slat conveyor cooperates with a flared hopper 87 fabricated in two sections from sheet metal or the like. The forward end of the hopper 87, adjacent the inlet end of the conveyor, is several times the width of the endless conveyor 67 so that a wide swath of crop material can be received. A fixed sickle bar 89 is attached along the forward edge of the hopper 87 to a sickle bar support in the form of an inclined ramp 85 in a position which is normal to the line of draft of the implement. The fixed sickle bar 89 includes the customary pointed sickle guards (as shown in section in Fig. 11) having rearwardly extending, upwardly inclined portions with a recess formed at the rear thereof to provide a guide for a moveable cutter bar 88 and, in addition, form a guard for the cutter bar. The rearward end of the hopper 87 merges smoothly into a pair of vertically disposed plates 90 which extend rearwardly to the blower housing. The plates 90 form a relatively deep trough through which the crop may be efficiently fed to the cutting and delivery unit. The width of the trough formed by the plates 90 is substantially the width of the cross-slat conveyor 67.

The outer side of the hopper 87, the side which is opposite the drawbar 37, is removable from the implement when it is desired to process row crops. The removable section of the hopper 87 is indicated at H in the drawings; the basic unit with the side H installed is shown in Fig. 4, and the basic unit less the side H is shown in Fig. 1. The method of attaching the side H to the harvester is shown in Fig. 3. The sickle bar support 85a of the side H is provided with a pair of holes 91 which register with holes 93 in the sickle bar support 85 on the basic unit. A bracket C is attached to the side of the downwardly extending frame portion 27 and this bracket is provided with a hole 95 which registers with a hole 97 in the bottom portion of the hopper section H. Registering holes 99 and 101 are also provided at the upper end of the unit. When connecting the side H to the hopper the registering holes 91 and 93, 95 and 97, and 99 and 101 are aligned and bolts or like fastening means 92, 96 and 98 (Fig. 4), respectively, are inserted in the registering holes. The guideways in the sickle bar sections 89 and 89a, being identical in cross section (as shown in Figs. 10 and 11), are then aligned so that a single cutter bar can extend across the entire width of the hopper 87 (Fig. 4).

A fabricated divider point 103 is provided at each end of the fixed sickle bar support 85 (Figs. 2 and 3) to guide the crop material into the hopper 87. The divider points merge smoothly with the sides of the hopper so that no projecting surfaces are formed which will collect crop material and impede its progress to the cutting and delivery unit.

The delivery roll 69 is of the general shape illustrated in the drawings and is supported on a shaft 105 which is moveable toward and away from the endless conveyor 67 in relation to the amount of material which is passing through the squeeze-type feed rolls 71 and 73. The upper, squeeze-type, feed roll 73 is of ribbed construction and is rotatively supported by a shaft 107. The shaft 107 is adjustably supported in a pair of vertically extending slots 109 in the main frame 21 and the ends of the shaft 107 are attached to a pair of springs (not shown) which resiliently bias the upper feed roll 73 against the lower feed roll 71. Each end of the delivery roll shaft 105 is connected to the corresponding end of the upper feed roll shaft 107 by a link member 111 so that the two rolls move proportional amounts in response to changes in the volume of material fed into the cutting and delivery unit 13. The lower, squeeze-type, feed roll 71 is supported upon a shaft 113 which is fixedly journalled into the frame 21. The feed roll 71 is desirably smooth surfaced.

A main gear box 115 is supported on the horizontal platform section 23 of the main frame 21 and the gear box 115 is connected to the power take-off shaft 57 through a safety clutch 117. The lower feed roll 71 is driven from a direct connection, not shown, to the main gear box 115 of the implement. The supporting shaft 107 for the upper feed roll 73 is operatively connected to a second outlet on the main gear box 115 by means of an extensible, power transmission shaft 119 which includes a pair of universal joints 121 that permit vertical movement of the upper feed roll 73. The rearward supporting shaft 81a for the cross-slat conveyor 67 is connected to the supporting shaft 113 for the lower feed roll 71 by means of a drive chain 123 which operatively joins a sprocket 125 on the feed roll shaft 113 to a sprocket 127 on the shaft 81a. Thus, the endless conveyor 67 is driven at a rate which is proportional to the peripheral speed of the feed rolls 71 and 73.

The delivery roll shaft 105 is operatively connected to the upper feed roll shaft 107 by means of a chain 129 which engages a sprocket 131 on the delivery roll shaft 105 with a sprocket 133 on the upper feed roll shaft 107. Both ends of the delivery roll supporting shaft 105 are extended outwardly, one end of the shaft 105 is adapted to drive a pair of power take-off sprockets 135 and 137. The sprocket 137 is keyed to the shaft 105 adjacent its end and the sprocket 135 is attached to a stub shaft 138 which is journalled in a bracket 143 attached to the platform section 23 of the main frame. The stub shaft 138 is operatively connected to the delivery roll shaft by an extensible shaft 139 and a pair of universal joints 141. The sprocket 137 thus moves with the delivery roll 69 and the sprocket 135 is maintained in fixed relation to the frame of the implement as the delivery roll 69 moves vertically in response to variations in the volume of material fed into the cutting and delivery unit 13.

Figure 5:
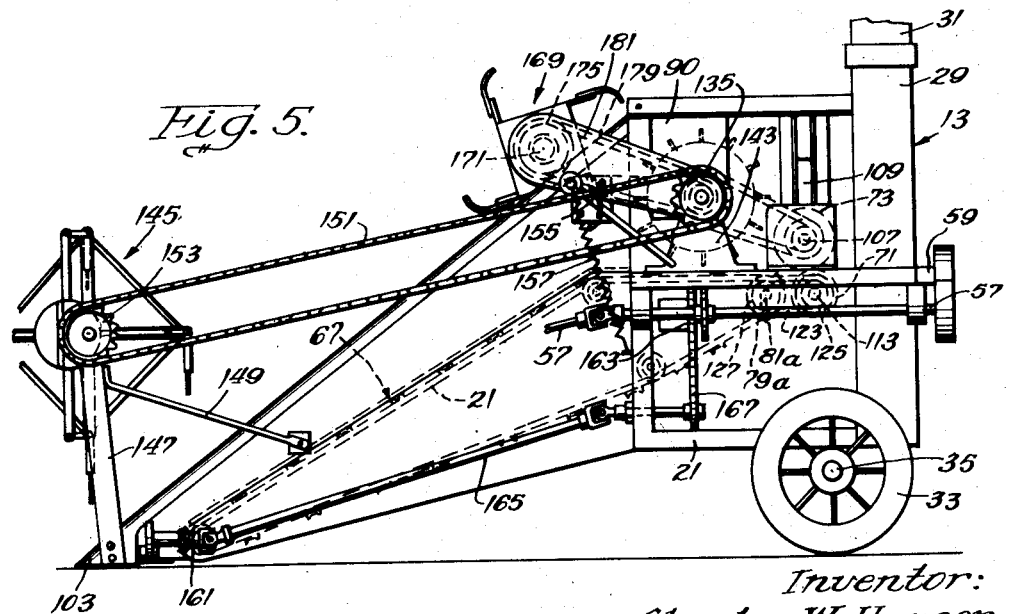

When handling field crops it is desirable that a grain reel be provided to move the crop into the hopper 87 and on to the conveyor 67 as the apparatus moves through the field. In the embodiment of the invention illustrated, a conventional grain reel 145 is supported above the fixed sickle bar 89 on a pair of brackets 147 attached to the divider points 103. The brackets 147 are braced by suitable structural members 149 such as are illustrated in Fig. 5. The grain reel 145 is driven by means of a forwardly extending drive chain 151 which operatively connects a sprocket 153 on the reel 145 with the sprocket 135 on the delivery roll power take-off shaft. The forwardly extending drive chain 151 is provided with a suitable chain tightener 155 which may be biased by a spring 157 (Fig. 5).

The moveable cutter bar 88 (Figs. 10 and 11) is supported within the guideway formed by the fixed sickle bar 89 along the forward edge of the hopper 87 in the usual manner. The cutter bar 88 is driven by means of an eccentric 161 which is connected to a sprocket 163 on the safety clutch 117 by means of a suitable drive shaft 165 and a chain and sprocket arrangement 167.

When handling field crops, it is desirable that a beater roll 169 be provided forwardly of the delivery roll 69 to precompact the crop as it enters the narrow trough formed by the vertical plates 90. The beater roll 169 (Figs. 4 and 5) is of the four-wing type and is of fabricated metal construction. The beater roll 169 is supported upon a shaft 171, and one end of the shaft 171 is rotatively journalled in a bearing attached to one end of a link member 173. The other end of the link member 173 is also provided with a bearing, and this bearing engages one of the extended ends of the delivery roll supporting shaft 105. The other end of the beater roll shaft 171 is splined and engages a suitable splined socket 175 which includes an integral sprocket 177. The sprocket 177 is rotated by means of a chain 179, which connects the sprocket 177 with the sprocket 137 on the delivery roll shaft 105. A chain guard 181 for the chain 179 supports the splined end of the beater roll shaft 171 in fixed relation to the delivery roll shaft 105, similarly to the link 173 on the other side of the machine.

The apparatus which has been described is adapted to be moved through a field of soy beans, clover, or other similar field crop, and is operable to mow the crop, to convey the mowed crop to the cutter and delivery unit which chops it into suitable lengths for silage, and to deliver the cut crop through the delivery pipe 31 to a wagon or other transport vehicle.

When it is desired to convert the field crop harvester to a row crop implement, the moveable cutter bar 88 is removed from its brackets and a short corn knife having one extremely strong cutter blade 183 is substituted in the fixed sickle bar 89 (Fig. 1). The grain reel 145 is removed from its brackets 147 and the grain reel drive chain 151 is also removed. The outer or removable section H of the hopper 87 is then removed and the grain reel mounting bracket 147 on the remaining divider point 103 is dismounted. Finally, the beater roll 169 is detached from its supporting link 173, and the socket 175 and the chain guard 181 are dismantled. The apparatus is then ready to receive a gathering point unit 185 (Figs. 6 and 7) in which there is formed a suitable stalkway 187 for receiving row crops.

The gathering point unit 185 includes a pair of fabricated gathering points 189 which are spaced apart to form the stalkway 187. The gathering points 189 are connected together at their upper, rearward, ends by means of a transversely extending stalk tilting bracket 191 and at their middle portion adjacent their bottom edge at the base of the stalkway by means of a combined, connecting bar and fixed corn knife 193. The stalk tilting bracket 191 and the connecting bar-fixed corn knife 193 constitute the only connection between the gathering points 189. When the gathering point unit 185 is attached to the basic unit, the connecting bar 193 is adapted to overlie the fixed sickle bar support 85 on the forward end of the cross slat conveyor 67, and the tilting bracket 191 is adapted to cooperate with the conveyor 67 and the delivery roll 69 to move the stalks butt first into the cutting and delivery unit 13. Thus, neither connection interferes with the stalkway 187.

The gathering point assembly 185 also includes two pairs of vertically spaced gathering chains 195 which are adapted to engage the stalks of corn and to move them rearwardly through the stalkway 187 until they are severed by the blade of the corn knife 193. The gathering chains 195 are of the usual construction and include a plurality of rake links 197 which are spaced apart by the usual chain links 199. The gathering chains 195 are supported on suitable sprockets 201 and 201a rotatably journalled in the gathering points 185, the rearward sprockets 201a being connected by means of generally vertically extending shafts 203 on whose upper ends are attached drive sprockets 205.

A cross shaft 207 is journalled in the gathering point frame so that it is protectively surrounded by the stalk tilting bracket 191 and a sprocket 209 is keyed to the outer end of the shaft 207. A drive chain 211 is provided to operatively connect the sprocket 209 to the sprocket 137, described in connection with the beater roll 69. A pair of bevel gear units 213 transmit power from the shaft 207 to a pair of sprockets 215 which are operatively connected to the sprockets 205 by means of drive chains 217.

Figure 8:
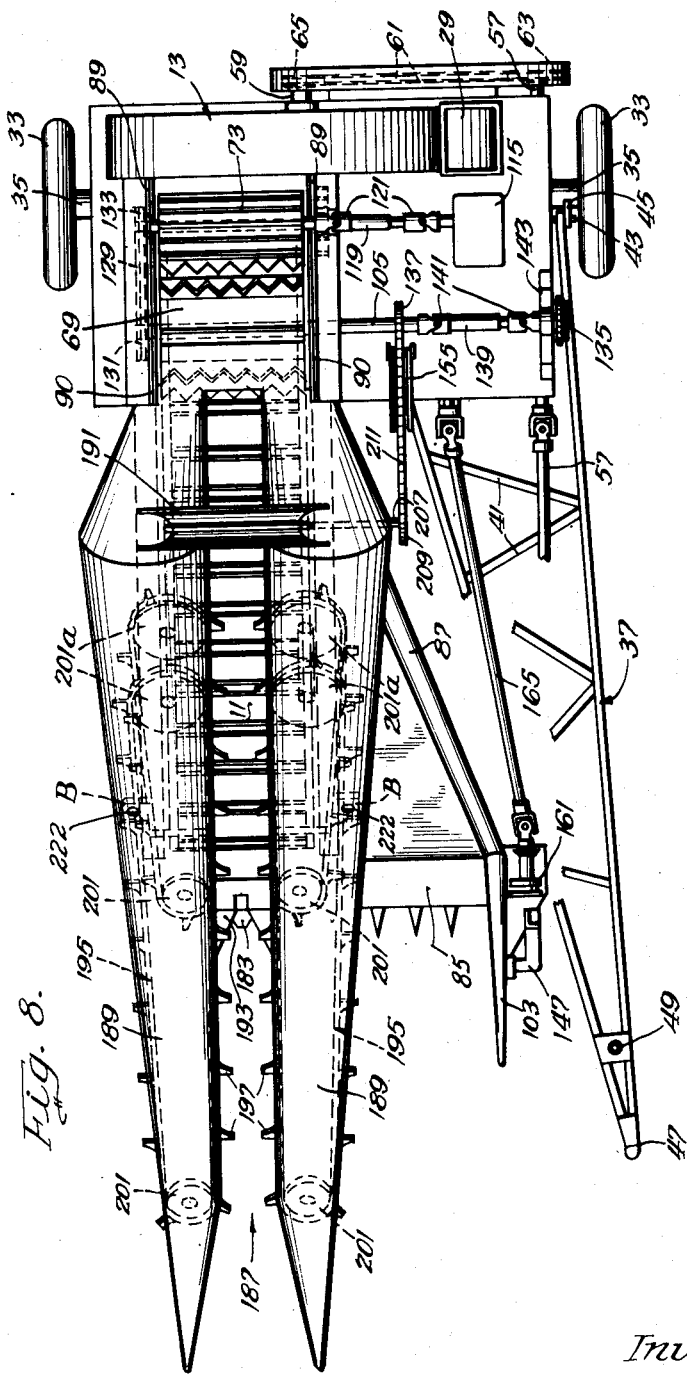

In order to facilitate the connection of the gathering point unit 185 to the basic unit, a plurality of holes 218, are provided in the rearwardly extending vertical flange portions of the gathering point unit (Figs. 6 and 7) which are adapted to register with holes in the vertically extending plates 90 on the main frame 21 for the insertion of bolts 220 or other fastening means (Fig. 9). Also, a pair of reinforced brackets B are fixed to an intermediate portion of the gathering point unit 185 which are adapted, respectively, to register with the bracket C in the downwardly extending frame portion 27 and a reinforced receptacle D provided in the bottom of the hopper 81 opposite the bracket C. The registering members B, C, and D are all provided with suitable holes whereby the gathering point assembly can be secured to the frame 21, as by bolts 222 (Figs. 8 and 9). As shown in the drawings, the width of the stalkway formed by the gathering points is substantially less than the width of the endless conveyor 67, this being an important feature in accomplishing the objects of the invention. The chain tightener 155 can be easily moved to provide the proper tension to the chains 211.

In operation as a row crop harvester, the gathering points and gathering chains gather the stalks of the crop, the corn knife severs the stalks, the conveyor means carries the crop material into the cutter and delivery unit wherein it is chopped into the proper length for silage and delivered to a suitable wagon or the like. It can be readily seen that the interchangeability gained by the use of this arrangement permits a farmer to harvest his crops as they develop in the field without the necessity of purchasing and maintaining two different harvesters. When the harvester is used as a row crop implement, its width is substantially reduced so that it can be easily maneuvered in a row crop field, and when the implement is used to harvest field crops, the width of the swath which is cut from the field is sufficiently wide that the processing mechanism is capable of running at capacity.

Various of the novel features of my invention are set forth in the appended claims.

I claim:

1. A basic crop handling unit adapted for use, selectively, with field crop and row crop harvesting attachments comprising; a wheel supported frame, an elongated conveyor, a support means for said conveyor secured to said frame in a position overlying said frame and extending forwardly and downwardly therefrom to a position in front of said frame, a sickle bar support mounted on the forward end of said conveyor support transversely of said elongated conveyor, a sickle bar fixed to said sickle bar support, attaching means fixed to the forward portion of said conveyor support means in position for detachable connection with the harvesting attachments, a pair of spaced-apart members extending upwardly on opposite sides of said conveyor at the rearward portion of the latter, said spaced-apart members each including additional attaching means for connection with a harvesting attachment, and a draw bar structure fixed to said frame and extending forwardly therefrom in laterally spaced relation to said conveyor support means and conveyor.

2. A basic crop handling unit adapted for use, selectively with field crop and row crop harvesting attachments comprising; a wheel supported frame, an elongated conveyor, a support means for said conveyor secured to said frame in a position overlying said frame and having a section inclined forwardly and downwardly to a position beyond said frame, a sickle bar support mounted on the forward end of said conveyor support transversely of said elongated conveyor, the end portion of said sickle bar support including connecting means affording attachment of an extension portion thereto, a sickle bar mounted on said sickle bar support, attaching means fixed to opposite sides of said inclined section of said conveyor support in position for connection with harvesting attachments, a pair of generally vertical, spaced-apart members carried by said frame adjacent the rearward portion of said conveyor in position on opposite sides of the latter, said vertical members including additional attaching means for supporting connection with a harvester attachment, and a draw bar structure fixed to said frame in forwardly extending relation thereto along one side of said conveyor.

3. A basic crop handling unit adapted for use, selectively with field crop and row crop harvesting attachments comprising, a wheel supported frame, a longitudinally extending endless conveyor, a support means for said conveyor fixed to said frame and having a generally horizontal section disposed above said frame and an inclined section extending forwardly and downwardly from said horizontal section, a pair of generally vertical, spaced-apart members disposed on opposite sides of the horizontal section of said conveyor support means, a crop-cutting means supported on said spaced-apart members in position to receive material from the conveyor, a delivery roll supported by said generally vertical members forwardly of said crop-cutting means in overlying relation to the horizontal section of said conveyor, a sickle bar support mounted on the forward end of said conveyor support transversely of the path of movement of said conveyor, the end portions of said sickle bar support including connecting means affording attachment of extension portions for said sickle bar support, a sickle bar mounted on said sickle bar support, attaching brackets fixed to said conveyor support on opposite sides thereof along said inclined section in position for connection with harvester attachments, additional attaching means adjacent said horizontal conveyor section including said pair of generally vertical, spaced-apart members for mounting harvester attachments, and a drawbar structure fixed to said frame in forwardly extending relation thereto along one side of said conveyor.

CHARLES W. HANSEN.

References Cited in the file of this patent

UNITED STATES PATENTS

| Number | Name | Date |
|---|---|---|
| 202,269 | Kelly | Apr. 9, 1878 |
| 601,247 | Galloway | Mar. 29, 1898 |
| 658,535 | Wagner | Sept. 25, 1900 |
| 1,165,119 | Parmelee | Dec. 21, 1915 |
| 1,173,238 | Youmans | Feb. 29, 1916 |
| 1,280,686 | Doremire | Oct. 8, 1918 |
| 1,340,461 | Ronning et al. | May 18, 1920 |
| 1,345,527 | Barker | July 6, 1920 |
| 1,598,843 | Bauercamper | Sept. 7, 1926 |
| 1,666,137 | Heuer | Apr. 17, 1928 |
| 1,727,616 | Pro | Sept. 10, 1929 |
| 1,731,259 | Murphy et al. | Oct. 15, 1929 |
| 1,960,978 | Redpath et al. | May 29, 1934 |
| 2,139,962 | Knudson | Dec. 13, 1938 |
| 2,269,828 | Michel et al. | Jan. 13, 1942 |
| 2,338,932 | Grant | Jan. 11, 1944 |